July 23, 1946. G. A. LYON 2,404,388
WHEEL STRUCTURE
Filed April 9, 1943

Inventor
GEORGE ALBERT LYON.
by Charles W Hills Attys.

Patented July 23, 1946

2,404,388

UNITED STATES PATENT OFFICE 2,404,388

WHEEL STRUCTURE

George Albert Lyon, Allenhurst, N. J.

Application April 9, 1943, Serial No. 482,372

2 Claims. (Cl. 301—37)

This invention relates to an improved wheel structure and is directed more particularly to an improved cover assembly therefor.

One of the important objects of the invention is to provide, for a wheel cover assembly, a new and improved retaining arrangement for maintaining the cover assembly upon the wheel structure.

Another object of the invention is to provide, for a wheel cover, an improved retaining arrangement whereby the development of rattle and vibration between the cover assembly and the wheel structure to which it is attached is prevented.

Still a further object of the invention is to provide, for a wheel cover, an improved retaining means which is arranged to bitingly engage a surface of the wheel structure to retain the cover thereon and yet which may be manipulated during a pry-off operation to be released from the wheel structure.

It is a further object of the invention to provide for a wheel cover, improved retaining means having resiliently, outwardly, radially extending fingers with terminal edges adapted to be disposed in biting engagement with a portion of the outer surface of a wheel structure thereby to securely retain the cover upon the wheel structure and whereby the biting engagement is augmented by axially outward movement of the retaining means and cover member from the wheel structure yet which may be released from the wheel structure by manipulation to urge the retaining means into an eccentric position whereby the biting engagement between the wheel structure and the teeth or fingers at one side thereof is released to afford removal of the assembly from the wheel.

Still another object of the invention is to provide for a wheel structure, a cover assembly including a resiliently compressible cover portion and retaining means engaged by the cover in such a manner that a portion of the resiliently compressible cover extends in sandwiched relationship between the retaining means and the wheel structure thereby to afford a cushioning effect for the retaining means.

Still another object of the invention is to provide for a wheel structure, a cover member having resiliently flexible characteristics such as those of a synthetic plastic, or rubber, either synthetic or natural, whereby the cover member may be locally flexed axially outwardly of the wheel structure to afford access to the rear side thereof, the cover member being formed to provide an improved arrangement whereby severe bending strains resulting in breakage will be avoided.

In accordance with the general features of the invention there is provided herein for a wheel structure, a resiliently flexible cover member having a cross-sectional configuration of such shape and magnitude that it extends over the outer side of the tire rim to conceal the same and may extend radially outwardly beyond the edge portion of the tire rim to overlie the outer side of a side wall of the tire in the wheel structure to constitute in effect a continuation of the side wall of the tire to give the appearance of a massive tire upon the wheel structure and to give the appearance of being a white side wall of a tire when colored white.

In accordance with still other general features of the invention there is provided herein a wheel cover assembly which includes a resiliently compressible, flexible, annular cover member arranged on the wheel structure as aforementioned and having on the inner peripheral part thereof an angularly disposed flange for bearing against a surface of suitable retaining means, the flange terminating in a peripheral part arranged to extend around an edge of the retaining means to overlie the reverse surface of the retaining means and to afford a cushion which may bear against the outer side of the wheel structure when the retaining means is secured thereto with the cover member.

Still another object of the invention is to provide a tire cover-retaining means assembly in which the retaining means includes an annulus and the cover member comprises an annulus of resiliently flexible material formed at the inner peripheral margin thereof to provide a substantially radially outwardly opening groove to receive the radially inner peripheral edge of the retaining means in retaining engagement, there being a portion of the retaining annulus struck out from the body thereof to provide abutment or reinforcing members arranged to overlie the radially inner margin of the axially inner surface of the cover member.

Other objects and advantages of the invention will become apparent from the following description and accompanying drawing in which.

It is to be understood that the embodiment shown herein is for illustrative purposes only and may be changed or modified without departing from the spirit and scope of the invention as set forth in the appended claims.

Figure 1:
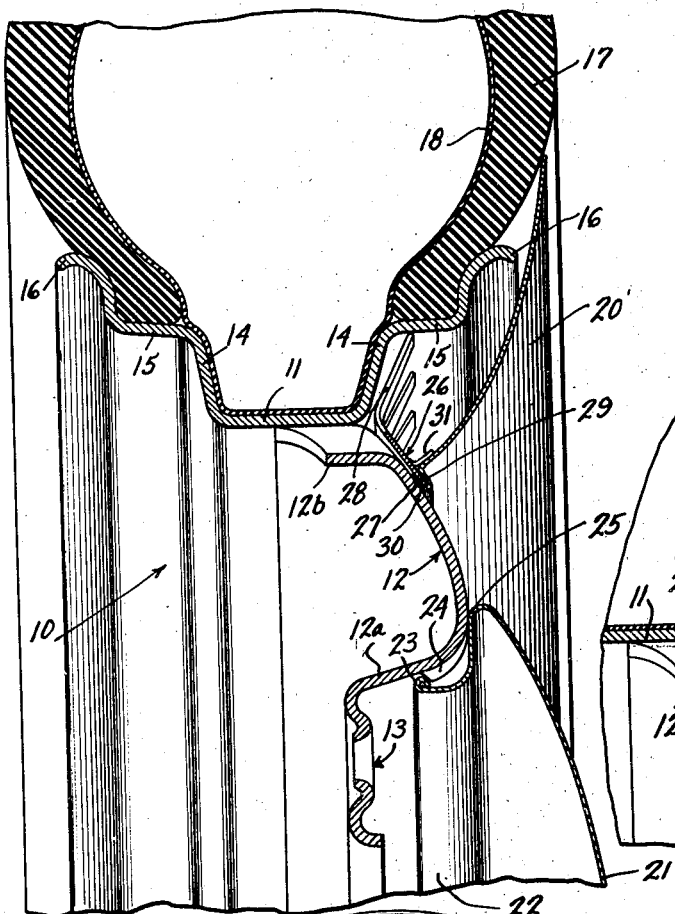
Figure 1 shows a fragmentary cross-sectional view of a wheel structure embodying my invention.
Figure 2:
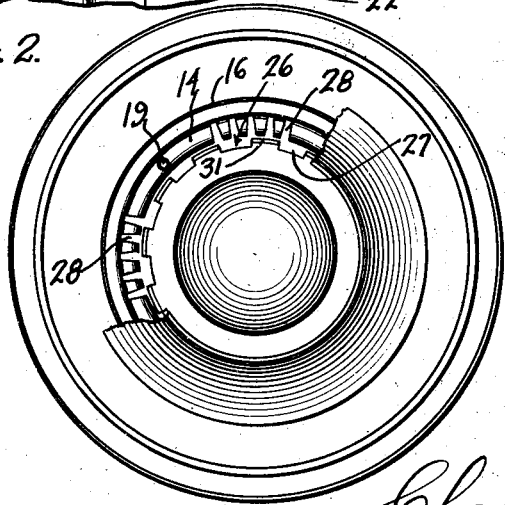
Figure 2 shows a side elevational view with parts broken away for illustrative purposes of the construction shown in Figure 1.

As shown on the drawing, particularly Figure 1, the reference character 10 designates generally a multi-flange, drop center type of tire rim which is connected as by riveting or welding or the like through a base flange 11 to a central body part or spider 12 which includes a central bolt-on flange 13. The drop center rim 10 is further provided with opposite side flanges 14, opposite intermediate flanges 15 and opposite edge portions 16. A suitable tire 17, having an inner tube 18 and a valve stem 19 (see Figure 2) is mounted on the rim, one of the side walls 14 having an orifice through which the valve stem 19 may project.

The cover assembly shown herein includes an outer annular cover portion 20 and a central hub cap simulating portion 21, the latter being secured to the body part or spider 12 of the wheel structure in any suitable manner but being shown herein as including a snap-on flange 22 terminating in a peripheral bead 23 which is arranged to be urged axially inwardly over the outer surfaces of humps 24 projecting radially inwardly from a stepped portion 12a of the body part 12 and being further arranged to be lodged against substantially axially inwardly extending faces of the humps 24 thereby to draw the radially outer extremity 25 of the hub cap portion 21 into tight engagement with the adjacent portion of the outer surface of the body part 12.

Figure 3:
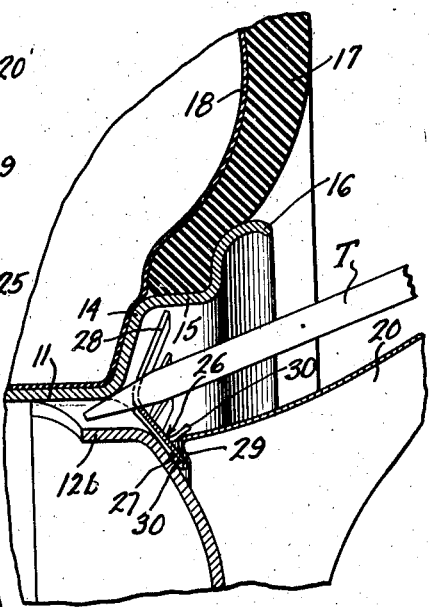
Figure 3 is a fragmentary cross-sectional view of the construction of Figure 1, the parts being shown in an eccentric position assumed during a pry-off operation.

As indicated previously, the cover member 20 is formed from a sheet material such as synthetic plastic or rubber, either synthetic or natural, or any other material having resiliently flexible characteristics enabling it to be flexed radially outwardly to render the rear side thereof accessible as shown in Figure 3. Furthermore, as will be seen from Figure 1, the radially outer margin of the cover member 20 extends radially outwardly beyond the edge portion 16 of the tire rim and into overlying relationship with the side wall of the tire 17. As is well known, when operated under load bearing conditions, the tire 17 expands laterally at that part which is on the lowermost side thereof adjacent the surface over which a vehicle is traveling. It will therefore be seen that the cover member 20, being constructed for resilient flexure as heretofore described, will flex freely, locally to accommodate the repeated and rapid lateral expansion and contraction of the tire.

With the foregoing construction of the cover member 20 it will also be seen that the cover assembly blends in contour with the side wall of the tire 17 and thus constitutes in effect a continuation of the side wall of the tire and gives the appearance of being a part of the same thus to appear as a portion of a massive tire mounted upon a wheel structure of minimum proportions. Furthermore, the cover member 20 is of such cross-sectional expanse that instead of the inner peripheral portion thereof curving inwardly at the junction of the tire rim 10 and the body part 12, the radially inward expanse thereof extends over the radially outer part of the body part 12 to provide a gradual inward curvature thus to further augment the effect of being a portion of the side wall of the tire in the wheel rim.

It will be readily understood that in retaining the cover member upon the wheel structure the optimum condition is that in which the retaining engagement is augmented upon a tendency to axial outward movement of the cover assembly from the wheel structure. Ordinarily with such a retaining engagement the cover assembly is, for all practical purposes, not conveniently removable from the wheel structure. Such a retaining egagement may be obtained by the use of a retaining annulus such as that shown at 26 herein.

The retaining annulus 26 includes an annular ring portion terminating in a radially inner marginal part 27 and radially outwardly, axially outwardly, obliquely disposed sharp ended resilient fingers 28, the ends of which prescribe a circle having a diameter larger than that of the radially inner surface of the intermediate flange 15 of the tire rim 10. Thus it will be seen that when the retaining annulus 26 is urged axially inwardly relative to the wheel structure so that the inner marginal portion 27 therein lies substantially parallel to the adjacent portion of the body part, the sharp ends of the fingers 28 are urged radially inwardly and into biting engagement with the surface of the intermediate flange 15. This biting engagement is augmented by any attempted outer axial movement relative to the wheel structure. As will be seen from Figure 2 the fingers 28 are preferably disposed in circumferentially spaced groups around the retaining annulus 26.

In order that the retaining annulus 26 may be utilized to secure the cover member 20 to the wheel structure and yet will be concealed therebehind, the cover member extends radially inwardly to the inner edge of the retaining means and is provided with a flange 29 adapted to be disposed in surface engagement with the inner peripheral margin of the retaining means 26 and terminating in a flange 30 which is formed so that, together with the flange 29, it envelops the peripheral edge portion of the retaining means. To the end that the foregoing attached relationship may be made more secure and in order to reinforce the radially inner portion of the axially inner surface of the cover member 20, axially outwardly, radially outwardly, obliquely disposed fingers 31 may be struck from the retaining member to be disposed in a position whereby they overlie the inner surface of the cover member 20 in abutting, reinforcing engagement therewith.

With the use of fingers 31 it will be seen that a secure corner junction is formed in the retaining member 26 to receive and support the corner junction between the wheel concealing part of the cover member 20 and the flange 29 thereof.

From the drawing it will be seen that the radially inner portion of the retaining member 26 is disposed in spaced relationship to the adjacent portion of the outer surface of the body part 12 of the wheel structure when the cover assembly is retained in the axially innermost position. This spaced relationship between the retaining member 26 and the wheel structure is effective to prevent the development of rattle, abrasion and vibratory noises between the parts of the wheel structure. Furthermore the flange 30, being formed from the resiliently compressible material of the cover member 20, serves admirably as a cushion between the parts thereby more effectively preventing the development of rattle and the like between the parts.

As indicated previously, the retaining fingers 28 are so arranged that once applied to the wheel, as shown in Figure 1, any axial outward movement thereof effectively increases the biting engagement with the wheel structure and thus increases the retaining engagement between the wheel structure and the cover assembly. In the past retaining constructions, such as that shown herein, have been associated with the wheel structure with the idea of providing a permanent attachment in which the disengagement of the cover assembly without the destruction of the retaining member was not contemplated. With the provision of a cover such as that shown at 20 however, which is locally, resiliently flexible to afford access to the rear side thereof and thus to the retaining means, it is now feasible to provide a retaining assembly adapted for biting engagement with the wheel structure but which may be easily and quickly released therefrom by a simple pry-off operation.

To the end that the foregoing removal of the retaining means 26 may be accomplished, the junction between the ring or annular portion of the retaining means and the radially outwardly extending fingers 28 thereof, may be in substantial axial alignment with some part of the wheel structure arranged to receive the radially outer side of a pry-off tool in pressure engagement when the latter is inserted over the radially outer edge of the ring part of the retaining member thereby to engage the same with radially inward pressure when the outer part of the tool is moved radially inwardly. It will be seen that under these circumstances the portion of the wheel structure which is engaged by the tool will serve as a fulcrum so that radially inward movement of the outer end of the tool will result in flexure of the retaining means into an eccentric position relative to the wheel structure whereby the ends of the teeth in the vicinity of the portion of the retaining means being engaged by the tool will be disengaged from the radially inner surface of the intermediate flange 15 of the tire rim whereby they may be drawn axially outwardly whereupon the remainder of the teeth may be easily disengaged from the wheel structure.

In order to accomplish the foregoing pry-off operation it will be seen, from Figure 3, that the cover member 20 may be flexed away from the tire and the tire rim, this flexure being augmented by bending of the junction between the flange 29 and the main portion of the cover member and being augmented further by the bodily flexure or distortion of the flange 29 about the junction thereof with the terminal flange 30. Thereafter any suitable tool, such as a screw driver T, may be inserted axially inwardly across the radially outer edge of the ring portion of the retaining member 26 so that the point thereof or an inner part thereof engages a substantially radially inwardly facing surface on the wheel structure. In the present instance, the wheel structure shown includes a body part 12 having an axially inwardly extending flange 12b which is provided with spaced depressions thereby to provide circumferentially spaced apertures at the junction of the tire rim and the body part 12. Thus the axially inner end of the pry-off tool T may be disposed at the corner junction formed between the flanges 11 and 14 of the tire rim 10. With the parts in the above described position it will be seen that radially inward movement of the outer end of the tool T will cause the same to fulcrum about its point of contact with the tire rim whereby the intermediate portion which engages the retaining annulus will force the same into eccentricity or will distort the same sufficiently so that the teeth 28 will become disengaged from the tire rim as shown in Figure 3. Thereafter the disengaged teeth together with the adjacent portion of the retaining member may be drawn axially outwardly from the wheel structure after which movement the remaining teeth may be easily and freely lifted from their contact with the tire rim 10.

From the foregoing it will be seen that there is provided herein a retaining arrangement which, in the past, has afforded a secure attachment of a cover assembly to a wheel structure and yet in which the secured engagement is augmented rather than diminished upon axial outward removal of the cover assembly from the wheel structure. In the present instance, however, the retaining member, while possessing the above mentioned attributes is so associated with the wheel structure in accordance with my invention and is associated with a cover member of such a nature that it is accessible to a pry-off tool and is adapted to be manipulated by the tool so that removal of the retaining means and the cover member may be accomplished.

Furthermore, there is provided herein retaining means so associated with the resiliently compressible and flexible cover member that a portion of the latter may be utilized as a cushion to prevent the development of rattle between the parts, the cover member being so configurated that flexing action thereof distributes bending strains over the inner marginal part thereof to prevent fatigue from setting in the plastic or other flexible material which may be used thus preventing breakage of the cover member due to strains imposed by flexing action thereof.

With regard to the distribution of bending strains impressed upon the cover member during outward flexure thereof from the wheel structure, it will be seen clearly from Figure 3 that this distribution is accomplished first in that some of the flexure takes place at the junction between the body part of the cover and the flange 29 thereof, while further flexure is absorbed by angularly bodily movement of the flange 29 away from the adjacent portion of the surface of the retaining means 26. Thus bending strains occurring during the flexure of the cover member are not localized at any particular part of the cover member but instead are distributed over various portions thereof to attain the desired end.

What I claim is:

1. In a cover assembly for disposition over the outer side of a wheel structure, an annular cover member and retaining means for securing the same to a wheel structure, said retaining means including a marginal portion arranged to be enveloped by the inner peripheral part of the cover member and abutment means struck from the body of the marginal portion of the retaining means to extend angularly therefrom and to engage a part of the cover member when the marginal portion of the retaining means is enveloped thereby.

2. In a cover assembly for disposition over the outer side of a wheel structure, an annular cover member and retaining means for securing the same to a wheel structure, said retaining means including a marginal portion arranged to be enveloped by the inner peripheral part of the cover member and abutment means struck from the body of the marginal portion of the retaining means to extend angularly therefrom and to engage a part of the cover member when the marginal portion of the retaining means is enveloped thereby, said abutment means being arranged to overlie the inner peripheral portion of the rear surface of the cover member to reinforce the same.

GEORGE ALBERT LYON.